United States Patent Office.

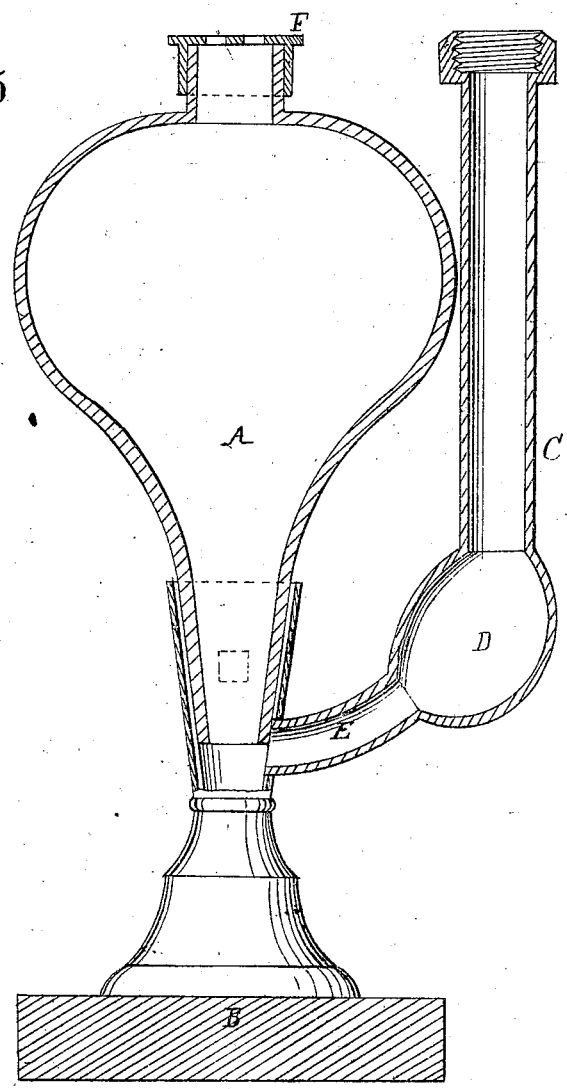

HIRAM B. WELLMAN, OF ALLEGHENY CITY, PENNSYLVANIA.

Letters Patent No. 73,145, dated January 7, 1868.

IMPROVEMENT IN LAMPS.

The Schedule referred to in these Letters Patent and making part of the same.

TO ALL WHOM IT MAY CONCERN:

Be it known that I, H. B. WELLMAN, of Allegheny City, in the county of Allegheny, and in the State of Pennsylvania, have invented certain new and useful Improvements in Lamps; and do hereby declare that the following is a full, clear, and exact description thereof, reference being had to the accompanying drawings, and to the letters of reference marked thereon. In the annexed drawings, making part of this specification—

A represents a vessel or reservoir, formed of glass in any desirable shape. This reservoir is secured upon a stand, B, and provided at its upper end with an opening which is covered by a cap, F. E represents a pipe, which enters the reservoir A at or near its bottom, said pipe entering and emptying into a chamber, D. C represents a pipe, the lower end of which connects to the chamber D. In the upper end of pipe C is cut a screw-thread, in order that an ordinary lamp-top may be secured to it. A lamp-top, with chimney and wick, is used upon the pipe C.

In using this lamp, water is poured into the vessel A, until the pipe E and the chamber D are filled. Oil is then poured into vessel A upon the water. Sufficient oil passes through the water in pipe E and chamber D, to fill and keep filled the pipe C to a level with the oil in reservoir A. The wick from the burner carries the oil up from pipe C to be burned. With this arrangement of reservoir and burner, there is less danger of explosion, as the body of the oil can be removed to any desirable distance from the burner. The oil is cleansed of any impurity by its passage through the water, and the evaporation from the water tempers, while at the same time it has a tendency, by supplying oxygen to the burner, to increase the light.

Having thus fully described my invention, what I claim as new, and desire to secure by Letters Patent, is—

The pipe C for oil, and the pipe E for water, having chamber D between them, when arranged in combination with the lamp A, and used for the purposes set forth.

In testimony that I claim the foregoing, I have hereunto set my hand, this 17th day of May, 1867.

HIRAM B. WELLMAN.

Witnesses:
 A. S. NICHOLSON,
 W. N. PAXTON.